(12) United States Patent
Friedman et al.

(10) Patent No.: US 7,513,019 B2
(45) Date of Patent: Apr. 7, 2009

(54) FASTENING MECHANISMS MAINTAINING ELECTRICAL CONNECTIONS AMONG FASTENED COMPONENTS

(75) Inventors: Jonathan D. Friedman, Seattle, WA (US); Victor E. Shiff, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 11/263,282

(22) Filed: Oct. 31, 2005

(65) Prior Publication Data
US 2008/0005875 A1 Jan. 10, 2008

Related U.S. Application Data

(60) Provisional application No. 60/642,370, filed on Jan. 5, 2005.

(51) Int. Cl.
*A44C 5/14* (2006.01)
(52) U.S. Cl. ...................... 24/265 WS; 63/3.1
(58) Field of Classification Search ............ 24/265 BC, 24/265 R, 265 WS, 700–702; 224/164; 340/539.1, 340/539.13, 539.31; 343/718, 720, 748, 343/788; 368/10, 282
See application file for complete search history.

(56) References Cited

U.S. PATENT DOCUMENTS

| | | | | |
|---|---|---|---|---|
| 1,263,276 A | * | 4/1918 | Carr | ............................ 24/700 |
| 1,514,578 A | * | 11/1924 | Carr | ............................ 24/700 |
| 3,929,265 A | * | 12/1975 | Pyne et al. | ................... 224/178 |
| 4,204,213 A | * | 5/1980 | Wheeler et al. | ............ 343/706 |
| 4,541,151 A | * | 9/1985 | Herchenbach et al. | . 24/265 WS |
| 4,586,827 A | * | 5/1986 | Hirsch et al. | ................ 368/282 |
| 4,670,947 A | * | 6/1987 | Lauper | ......................... 24/71 J |
| 5,159,713 A |  | 10/1992 | Gaskill et al. | |
| 5,179,733 A | * | 1/1993 | Matsui | ........................ 368/282 |
| 5,303,421 A | * | 4/1994 | Goldenberg | ................ 455/344 |
| 5,964,440 A |  | 10/1999 | An et al. | |
| 6,175,729 B1 | * | 1/2001 | He et al. | ...................... 455/344 |
| 6,659,805 B2 |  | 12/2003 | Siddiqui et al. | |
| 6,775,206 B2 |  | 8/2004 | Karhu | |

(Continued)

FOREIGN PATENT DOCUMENTS

GB     2396990     7/2004

OTHER PUBLICATIONS

MFJ Enterprises, Inc., Dual Time Ham Radio Wrist Watch, http://www.mfjenterprises.com/products.php?prodid=MFJ-182.

(Continued)

*Primary Examiner*—Robert J Sandy
*Assistant Examiner*—Ruth C Rodriguez

(57) ABSTRACT

Fastening mechanisms are disclosed for engaging and disengaging device components while maintaining electrical connections among engaged components. A male fastening mechanism may include a front male head portion with a larger circumference than a relatively narrower lower male body portion. A female fastening mechanism may include an opening in a housing structure for receiving the front male head portion. A clip or spring may be arranged in the female housing surrounding portions of the opening. Moreover, the spring's terminating portions may be unconnected and protrude into the opening. The spring may be displaced to accommodate the front male head portion as it enters the female housing opening between the spring's terminating portions. The spring may retract or snap back inwards towards the relatively narrower lower male body portion as it passes through the opening and past the spring's terminating portions to engage the mechanisms and secure device components together.

18 Claims, 16 Drawing Sheets

U.S. PATENT DOCUMENTS

| | | | |
|---|---|---|---|
| 6,927,739 | B2 | 8/2005 | Nomura et al. |
| 7,278,783 | B1 * | 10/2007 | Hiranuma et al. ........... 368/282 |
| 2004/0047241 | A1 | 3/2004 | Weng |
| 2004/0090868 | A1 | 5/2004 | Endo et al. |
| 2004/0151071 | A1 | 8/2004 | Kocher |
| 2004/0243342 | A1 | 12/2004 | Rekimoto |
| 2005/0014541 | A1 | 1/2005 | Clerc et al. |
| 2005/0054321 | A1 | 3/2005 | Casagrande et al. |

OTHER PUBLICATIONS

Eleit International Limited, Digital Two-Way Radios/Walkie-Talkie in Wrist Watch Type http://www.trade-india.com/selloffer/665179/Digital-Two-Way-Radios-Walkie-Talkie-In-Wrist.

Xact Communication WristLinx X33XIF 2-Way Wristwatch Communicator (Pair) http://www.markcarey.com/watches/store/p/B000246X32.

TV Wristwatch the watch you can really watch http://www.firebox.com/?dir=firebox&action=product&pid=1060.

* cited by examiner

FASTENING MECHANISMS MAINTAINING ELECTRICAL CONNECTIONS AMONG FASTENED COMPONENTS

PRIORITY CLAIM

This application claims the benefit of U.S. Provisional Patent Application Ser. No. 60/642,370 filed on Jan. 5, 2005, which is herein incorporated by reference.

TECHNICAL FIELD

The technology relates generally to fasteners for wireless or mobile communication devices and, more particularly, to fastening mechanisms that may establish substantially stable and/or flexible mechanical connections among a number of mobile device components without interfering with the operation of the device's functional components or disrupting substantially continuous electrical connections.

BACKGROUND

As society becomes more mobile, the use of wireless communication devices is growing rapidly because they can provide people with real time information. The increasingly miniaturized components being employed in these devices have led to the development of wireless devices that may be worn on or otherwise attached to a person's body.

People's expectations of a wireless communication device's aesthetic appearance often changes when they wear these types of devices. They often want the worn devices to look like traditionally worn artifacts or otherwise have a nice, aesthetically pleasing appearance. The wireless communication environment these devices are designed to operate in, however, may often limit the types of materials used in their manufacture. For instance, some materials may interfere with the reception of radio signals and their use in these devices is therefore avoided.

SUMMARY

The following section of this patent application document presents a simplified summary of the disclosed subject matter in a straightforward manner for readability purposes only. In particular, this section attempts expressing at least some of the general principles and concepts relating to the disclosed subject matter at a relatively high-level simply to impart a basic understanding upon the reader. Further, this summary does not provide an exhaustive or limiting overview nor identify key and/or critical elements of the disclosed subject matter. As such, this section does not delineate the scope of the ensuing claimed subject matter and therefore the scope should not be limited in any way by this summary.

A number of mutually cooperating fastening mechanisms are disclosed that may be implemented to securely and/or detachably fasten or couple together a number of device components. Moreover, the disclosed fastening mechanisms may maintain any electrical connections among the device components being fastened together, for instance. As will be discussed in greater detail further herein below, some device components may use electrical connections established among them to operate properly.

By the same token, these device components may sometimes need to be mechanically or physically separated and then reconnected with each other for a number of reasons. Thus, the disclosed fastening mechanisms may enable these types of device components to be securely fastened and unfastened while restoring and/or maintaining any electrical connections among the reconnected components.

Where the disclosed fastening mechanisms may be implemented in a mobile device, such as a wristwatch type device with processing capabilities beyond traditional time keeping functionalities, for instance, the fastening mechanisms may be implemented as mutually cooperating male and female fastening mechanisms. Such mutually cooperating male and female fastening mechanisms could be used to fasten together a number of the device's components, such watchbands that may be used for attaching the device to a person's arm, for instance.

By way of example only, the exemplary mobile device may utilize one or more antennae components embedded in the watchbands for receiving radio signals or broadcasts. In this case, the disclosed mutually cooperating male and female fastening mechanisms may securely and detachably fasten the watchbands together while restoring and/or maintaining the connection between the antennae components embedded in the watchbands.

As will be described in greater detail further herein, the mutually cooperating male and female fastening mechanisms may be structurally configured in a number of ways that may enable the mechanisms to engage each other when twisting forces and/or other types of forces are applied on at least some of the mechanism's components by users, for example. Moreover, the disclosed structural configurations for the male and female fastening mechanisms may be implemented without substantially increasing the size or weight of the devices they are implemented in, and may enable using a greater variety of materials in the manufacture of mobile device type devices.

BRIEF DESCRIPTION OF THE DRAWINGS

The ensuing detailed description section will be more readily appreciated and understood when read in conjunction with the accompanying drawings, wherein.

The same reference numerals and/or other reference designations employed throughout the accompanying drawings are used to identify identical components except as may be provided otherwise.

DETAILED DESCRIPTION

Figure 1:
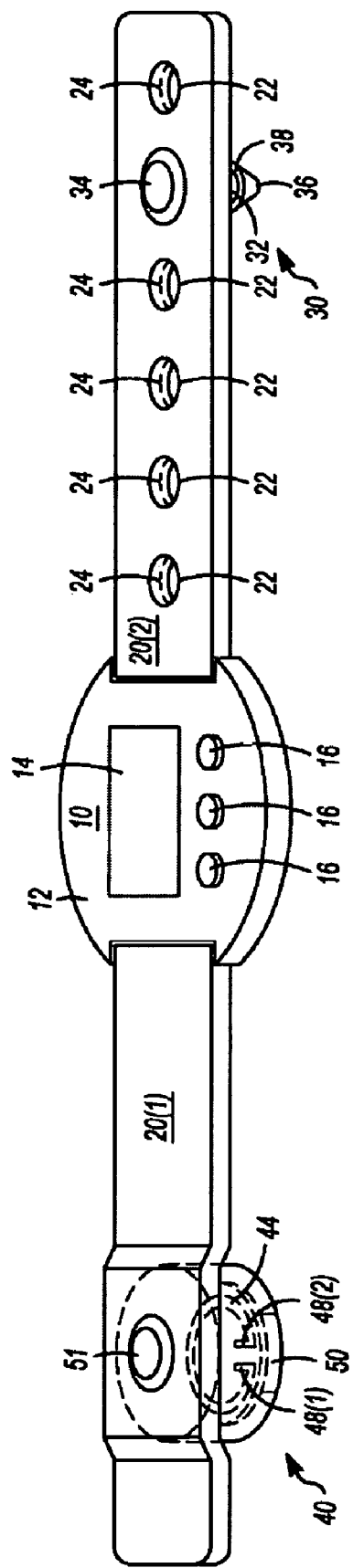
FIG. 1 is an isometric view of a mobile device with a number of fastening mechanisms that may maintain electrical connections among a number of fastened device components.

The accompanying drawings and this detailed description provide exemplary implementations relating to the disclosed subject matter for ease of description and exemplary purposes only, and therefore do not represent the only forms for constructing and/or utilizing one or more components of the disclosed subject matter. Further, while this description sets forth one or more exemplary operations that may be implemented as one or more sequence(s) of steps expressed in one or more flowcharts, the same or equivalent operations and/or sequences of operations may be implemented in other ways.

Generally, mobile devices are mechanisms that may employ a number of components for processing wireless communication signals in connection with performing device related functionalities. For instance, antennae components may be used for receiving wireless signals, such as high, very-high, and/or ultra-high frequency signals, which may be sent from transmitters. Wireless communication broadcasts may be transmitted in a number of formats, such as standard FM transmissions, sub-carrier FM transmissions, or any other type of FM transmission. Other components may be used by the mobile devices to process the information encoded in the signals or broadcasts, for instance.

As explained earlier, some of the processing components employed in mobile devices may be susceptible to interference under certain conditions. For instance, incorporating metallic or other conductive materials in the structural components of some mobile devices may interfere with the device's operation. As a result, the use of these types of materials in these devices may require careful consideration to avoid any such adverse effects, although oftentimes in conventional applications their use is avoided altogether.

An approach for using potentially interfering materials in mobile device design and manufacture in the case of a mobile wristwatch device, for example, may be to embed one or more portions of the device's signal receiving antenna components substantially within one or more non-conductive or insulated portions of the watchband. This approach may allow such conductive materials to be incorporated into a number of the mobile wristwatch device's components while reducing or eliminating any harmful effects. For instance, metal links could be attached onto portions of the device's wristband and/or metal may be used to form portions of the watch casing.

Particular implementation details may still need to be carefully considered when different types and amounts of conductive materials are included in these device's components. In the mobile wristwatch device's case, results could conceivably vary if the embedded antennae were configured or shaped in different ways or for other reasons. For example, embedding an antenna throughout the portions of a watchband to form a substantially complete circuit loop may provide a desired level performance in some if not many cases.

However, these types of workarounds could create other challenges that may also merit careful consideration. By way of example only, there may be unanticipated manufacturing and/or engineering challenges associated with actually embedding antennae components in watchbands and/or maintaining substantially complete circuit loops. For instance, watchbands designed to separate and reconnect could provide challenges relating to reestablishing reliable connections between any watchband-embedded antennae components during reconnect.

Aside from those challenges, consumers often expect or desire wearable mobile devices that closely resemble their traditionally worn counterparts. At the same time, consumers are also increasingly demanding smaller, sleeker and more unobtrusive products. The components generally available to manufacturers for designing and making wearable mobile devices may not provide conventional options or opportunities for making these devices any smaller in many cases. As such, a number of fastening mechanisms are disclosed that could be implemented as at least one approach to addressing one or more of these challenges should they ever arise.

Referring generally to FIGS. 1-16, a mobile device 10 is shown as having device straps or bands 20(1) and 20(2) coupled to portions of the device's casing 12. These device straps or bands 20(1) and 20(2) may be used to attach the mobile device 10 to a user's wrist, for example. A male fastening mechanism 30 and a female fastening mechanism 40 on the device straps 20(1)-20(2) may be manipulated by users for engaging the mechanisms 30 and 40 to each other to securely and detachably fasten the straps 20(1) and 20(2) together. Moreover, the male and female fastening mechanisms 30 and 40 may be structurally configured to restore and/or maintain any electrical connections between portions of an antenna structure 24 that may be substantially embedded within the device straps 20(1) and 20(2).

Referring now specifically to FIG. 1, the mobile device 10 may comprise a casing 12 that may enclose one or more of the device's internal processing components. Output that may be generated by the internal processing components may be presented visually via a display 14 arranged on a face portion on the device's casing 12, although output may be presented in other ways. Further, one or more user interface mechanisms 16, such as buttons and/or dials, for example, may be arranged on the device's casing 12 to enable users to provide input to the internal processing components of the mobile device 10, for example.

The mobile device 10 may be attached or otherwise fastened to a user's arm, for example, with device straps or bands 20(1) and 20(2). The bands 20(1) and 20(2) may be formed of a number of materials, such as polyurethane, metal, and/or any other materials or combinations of materials, for example. However, where the casing 12 of the mobile device 10 may be formed of metal, a number of insulating materials may be arranged at locations where portions of the casing 12 may be coupled to portions of the device bands 20(1) and 20(2) to avoid causing interference with any conductive materials or structures that may be embedded within the bands 20(1) and 20(2), for instance.

As shown in FIG. 1, one or more portions of an embedded antenna structure 24 may be visible inside a number of openings 22 formed in the device bands 20(1) and 20(2), for instance. These embedded antenna structures 24 may comprise conductive material forming radio signal/broadcast receiving antennae for receiving radio signals that may be processed by the internal processing components of the mobile device 10, for example. Further, while the openings 22 depicted in FIG. 1 are shown as having a substantially circular shape, the openings may be configured in other ways, such as slot or oval configurations, and other mechanisms may be used in place of openings. Additionally, the particular number of openings 22 shown in the bands 20(1) and 20(2) is merely for exemplary and descriptive purposes only.

By way of example only, a portion of the male fastening mechanism 30 may engage the female fastening mechanism 40 by protruding through a fastening opening 50 that may be formed in the female fastening mechanism 40, for instance. Further, male and female fastening mechanisms 30 and 40 may be positioned or moved towards each other until a distal male head surface structure 36 on the male fastening mechanism 30 approaches the female engagement opening 50.

As the distal male fastener head surfaces 36 protrudes deeper or further inside the female engagement opening 50, for example, the surface 36 may engage spring engagement portions 48(1) and 48(2) of clip or spring structure 44 arranged in a channel 43 formed in female housing 42, for instance. This may potentially cause the spring engagement portions 48(1) and 48(2) to substantially spread apart responsive to the shape or configuration of the indented male engagement surfaces 38, for instance, as will be discussed further down below.

The spring structure 44 may be formed of a number of materials, such as metals and/or plastics, which may substantially flex when pressure or force is applied, for instance. When one or more indented male engagement surfaces 38 on the male fastening mechanism 30 engage the spring engagement portions 48(1) and 48(2), the spring structure 44 may spring back in the opposite direction it may have been spread apart from to substantially return to an original or initial resting state or configuration prior to engaging the distal male fastener head surfaces 36, for instance. Further, the retracted spring engagement portions 48(1) and 48(2) may be securely positioned adjacent to one or more male indented engagement surfaces 38. As such, the male fastening mechanism 30 and the female fastening mechanism 40 will now be described in greater detail below with reference to FIGS. 2-16.

Figure 2:
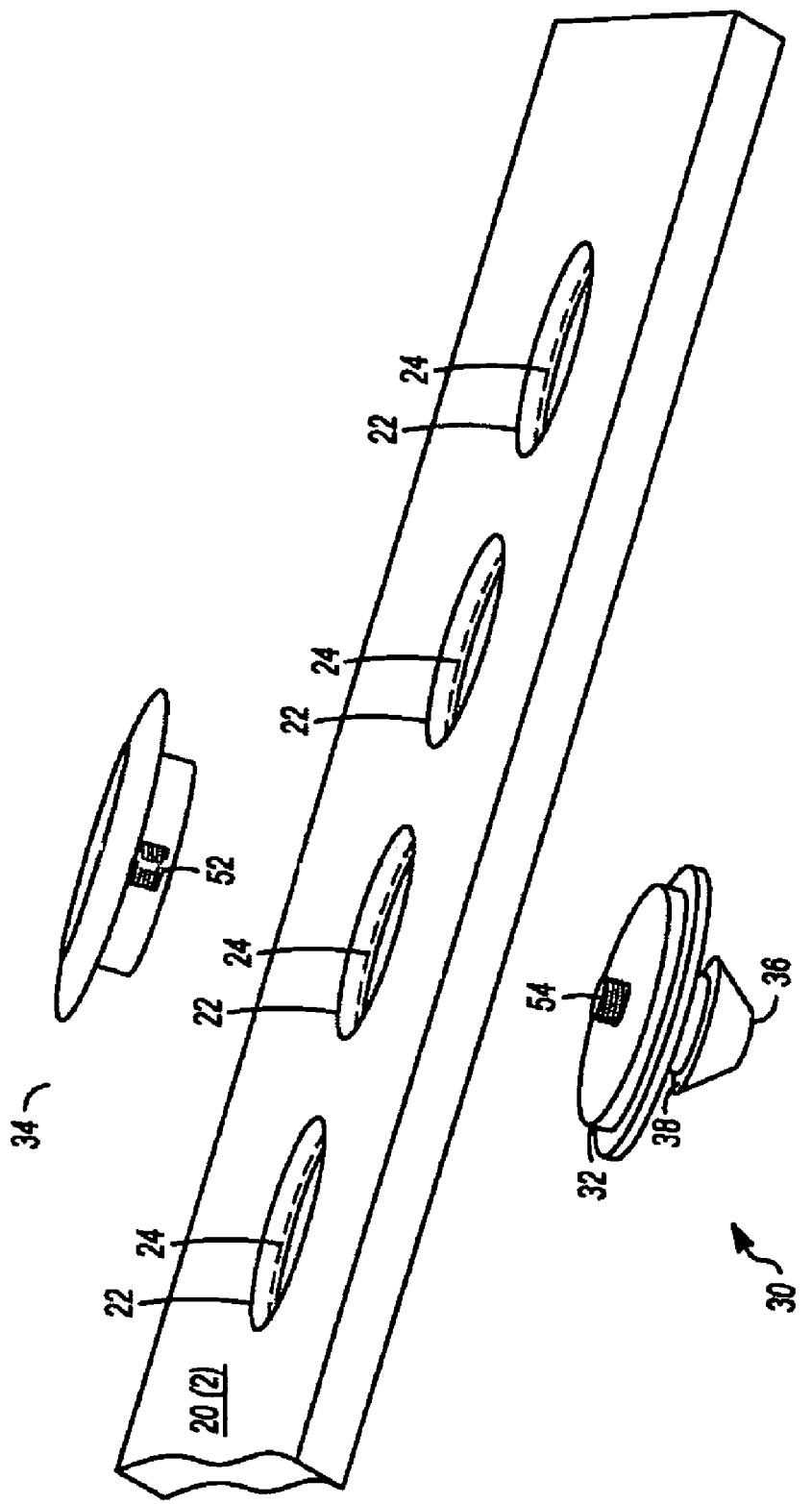
FIG. 2 is a partial perspective exploded view of an exemplary implementation for a first fastening mechanism in the mobile device illustrated in FIG. 1.

Referring now specifically to FIG. 2, the male fastening mechanism 30 may comprise a number of structures, such as the male fastener body surfaces 32 and a male fastener cap 34, although the mechanism 30 may comprise a fewer or greater number and other types of structures and/or may be formed as a substantially single integrated structure. As shown in FIG. 2, the male fastening mechanism 30 may be arranged at any particular band opening 22 for a number of reasons, such as to provide a way of adjusting the circumference of the device bands 20(1) and 20(2) when fastened together, for instance.

The particular opening 22 where the male fastening mechanism 30 is depicted in FIG. 2 as being positioned was arbitrarily selected for exemplary and illustrative purposes only. In this example, a threaded male engagement portion 54 on the male fastening mechanism 30 may cooperatively engage a threaded opening 52 that may be formed in the male fastener cap 34, for instance, to position the mechanism 30 on the device band 20(2), for example. Furthermore, the male fastening mechanism 30 may be formed of a conductive material so that it may engage and physically contact a portion of antenna structure 24 that may be embedded in the device band 20(2), for instance. Coupling the antenna structure 24 and the male fastening mechanism 30 in this manner may help ensure that an electrical circuit may substantially remain closed or substantially complete with respect to other portions of the antenna structure 24 that may be embedded in the other device strap 20(1), for instance.

Figure 3:
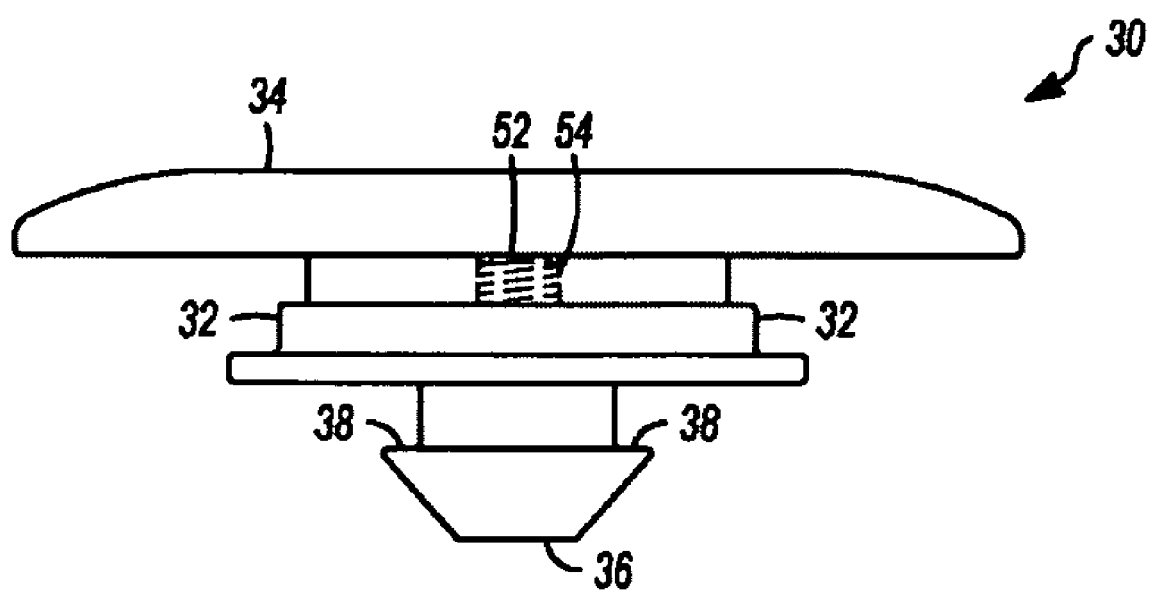
FIG. 3 is a side view diagram of the first fastening mechanism illustrated in FIG. 2.

Referring to FIG. 3, when the male fastening mechanism 30 shown in FIG. 2 is assembled in this particular example, the mechanism 30 may appear from a view in the manner shown in FIG. 3. It should be noted that that the device strap portion 20(2) was omitted from FIG. 3 for clarity. However, the male fastener body surfaces 32 on the male fastening mechanism 30 may be positioned substantially within and/or substantially enclosed by a portion of the opening 22 and/or structure 24 formed in the device strap 20(2), for instance.

Figure 4:
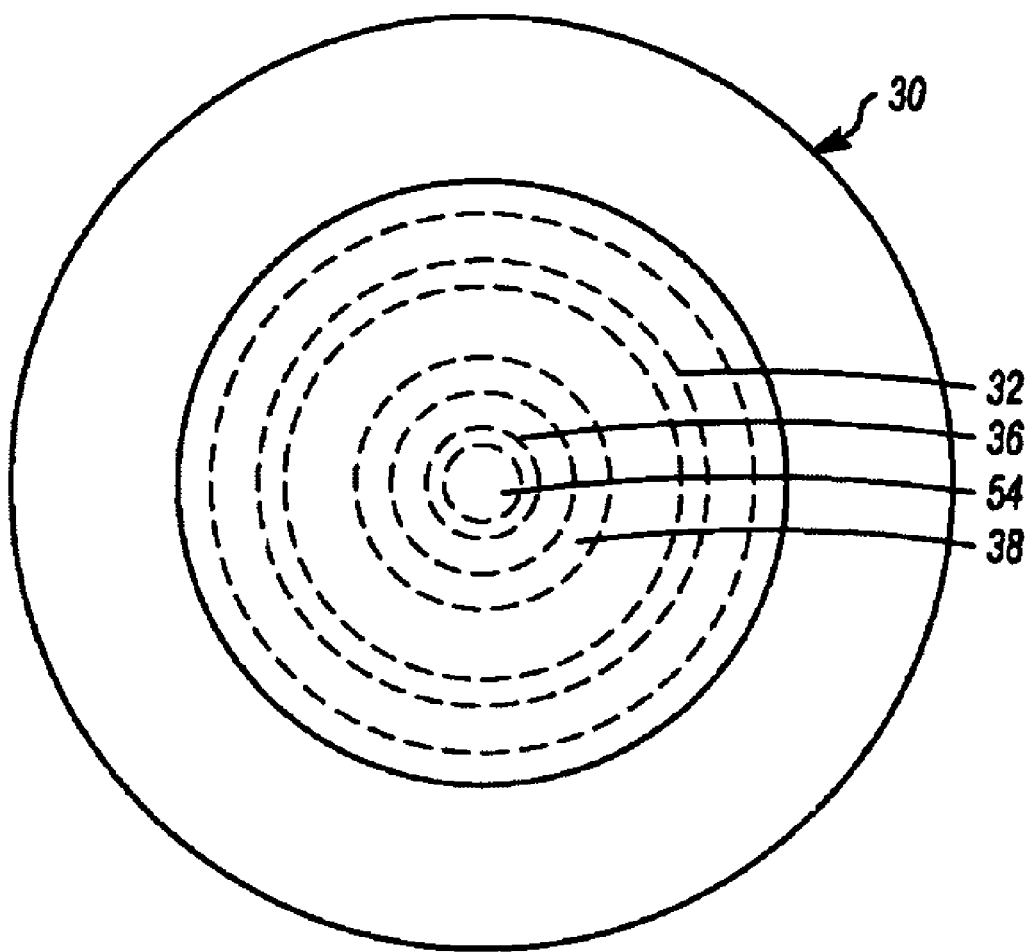
FIG. 4 is a is a top view diagram of the first fastening mechanism illustrated in FIG. 2.
Figure 5:
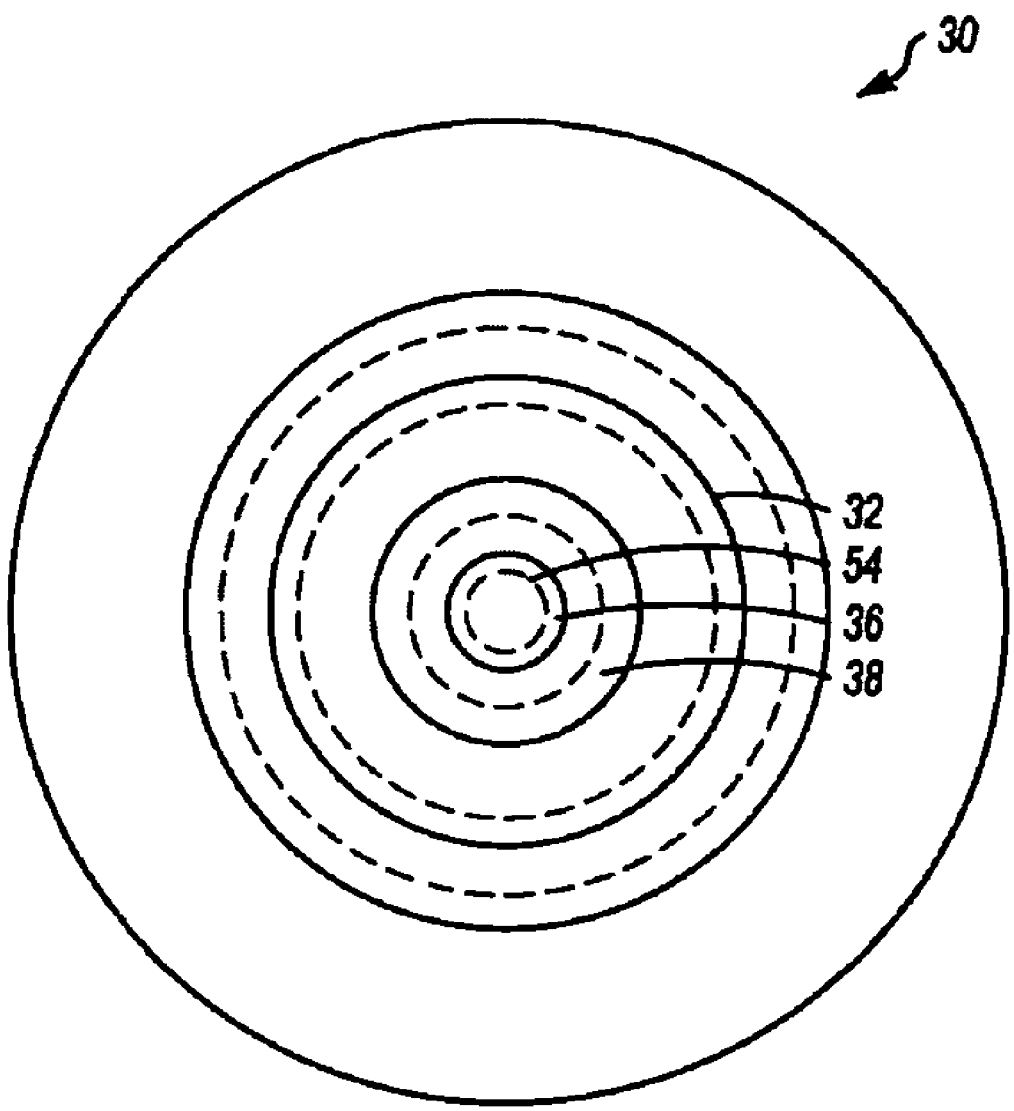
FIG. 5 is a partial perspective bottom view of the first fastening mechanism illustrated in FIG. 2.

Referring to FIGS. 4 and 5, top and bottom perspective views of the male fastening mechanism 30 are provided. For purposes of clarity, it is noted that the top portion of the male fastening mechanism 30 may correspond to the male fastener head surfaces 36 despite any illustrations that may show this surface 36 as being in a bottom orientation. For instance, the male fastener cap 34 shown in FIG. 3 may appear to form a top portion of the mechanism 30 based on the particular orientation selected for illustrating the mechanism 30. However, in FIG. 3 or any other similar situations, the male fastener head surfaces 36 should still be regarded as representing the top portion of male fastening mechanism 30 by way of example only.

As shown in FIG. 4, the diameter of the mechanism 30 measured at the male fastener head surfaces 36 may be substantially smaller than the diameter of the mechanism 30 measured at the indented male engagement surfaces 38, resulting in a substantially conical configuration or shape, although a number of other shapes could be used. The bottom portion of the male fastening mechanism 30 shown in FIG. 5 may represent a distal portion of the mechanism 30 with respect to the male fastener head surfaces 36 forming the top portion, for instance. It should be noted that the male fastener cap structure 34 was omitted from FIG. 5 for clarity only.

Figure 6:
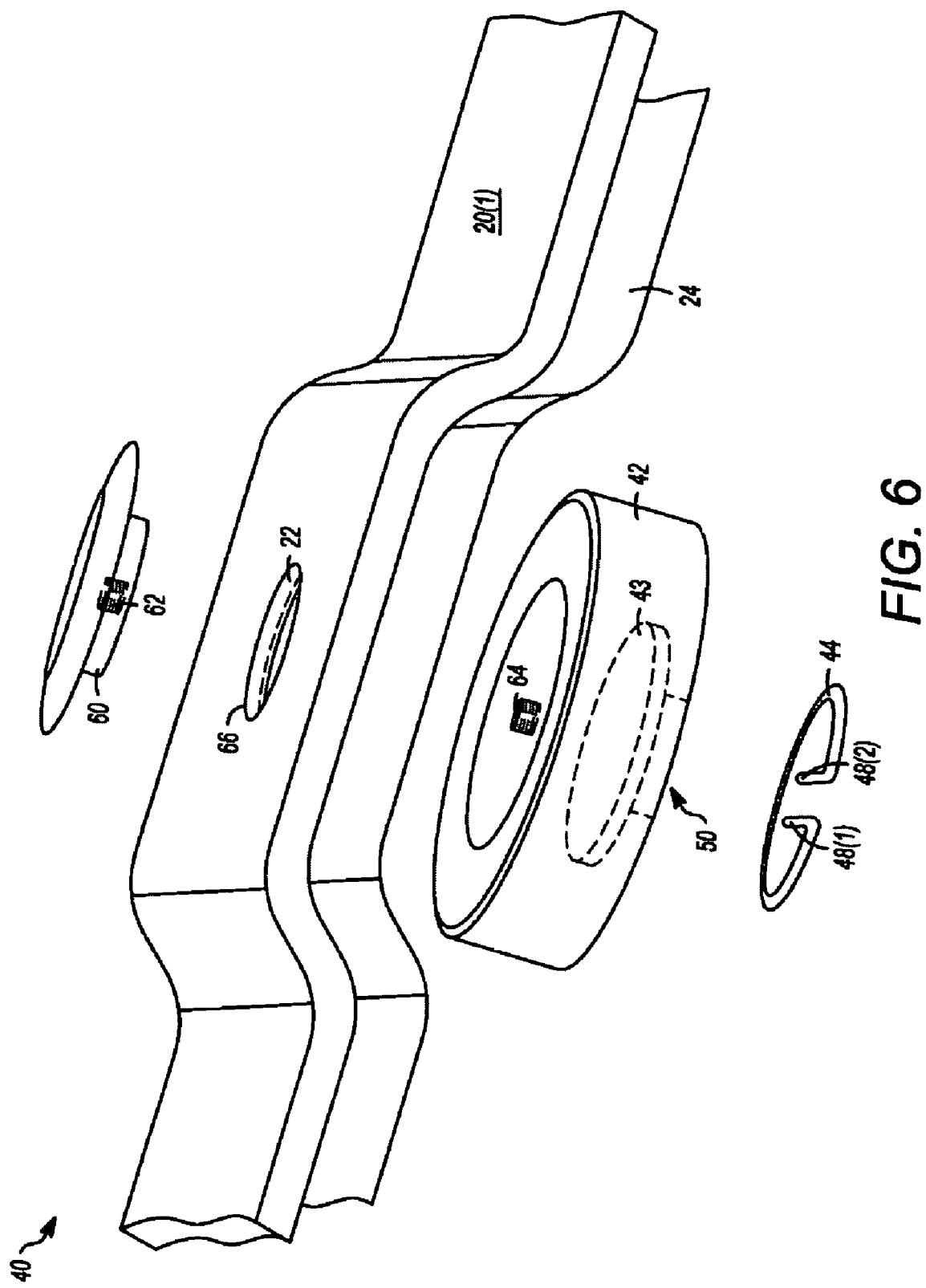
FIG. 6 is a partial perspective exploded view of an exemplary implementation for a second fastening mechanism in the mobile device illustrated in FIG. 1.

Referring to FIG. 6, the female fastening mechanism 40, described above briefly with reference to FIG. 1 will now be described in greater detail. It should be appreciated that the particular configurations and the number of structures selected for illustrating and describing this exemplary female fastening mechanism 40 is provided by way of example only as any number of other configurations and/or structures may be used.

As shown in FIG. 6, the female fastening mechanism 40 may comprise a number of mechanisms, such as the female housing 42, which may engage with a corresponding female fastener cap 51 for attaching the mechanism 40 to a portion of the device strap 20(1), for example. A corresponding threaded female cap opening structure 64 may be formed in the housing 42 for receiving a corresponding threaded connector 62 extending out from a female cap body portion 60 of the female fastener cap 51, for instance.

The female fastening mechanism 40 may comprise one or more channel structures 43 formed within the female housing 42 for accommodating the clip or spring structure 44. The spring structure 44 may be arranged substantially within the channel structure 43 substantially surrounding the female engagement opening 50 formed in the female housing 42, for instance. Further, the channel structure 43 may be formed in the female housing 42 in a manner that substantially permits at least a portion of the spring 44 to flex in the manner described in greater detail further herein.

By way of example only, when the female fastening mechanism 40 structures are assembled together, the mechanism 40 may rotate with respect to an axis that may run from and through a substantial center point on the female fastener cap 51 to a another substantial center point on the corresponding threaded female cap opening structure 64, for instance. A bushing or ball bearing mechanism 66 may be arranged in the opening 22 to facilitate the mechanism 30's rotation, for example.

Figure 7:
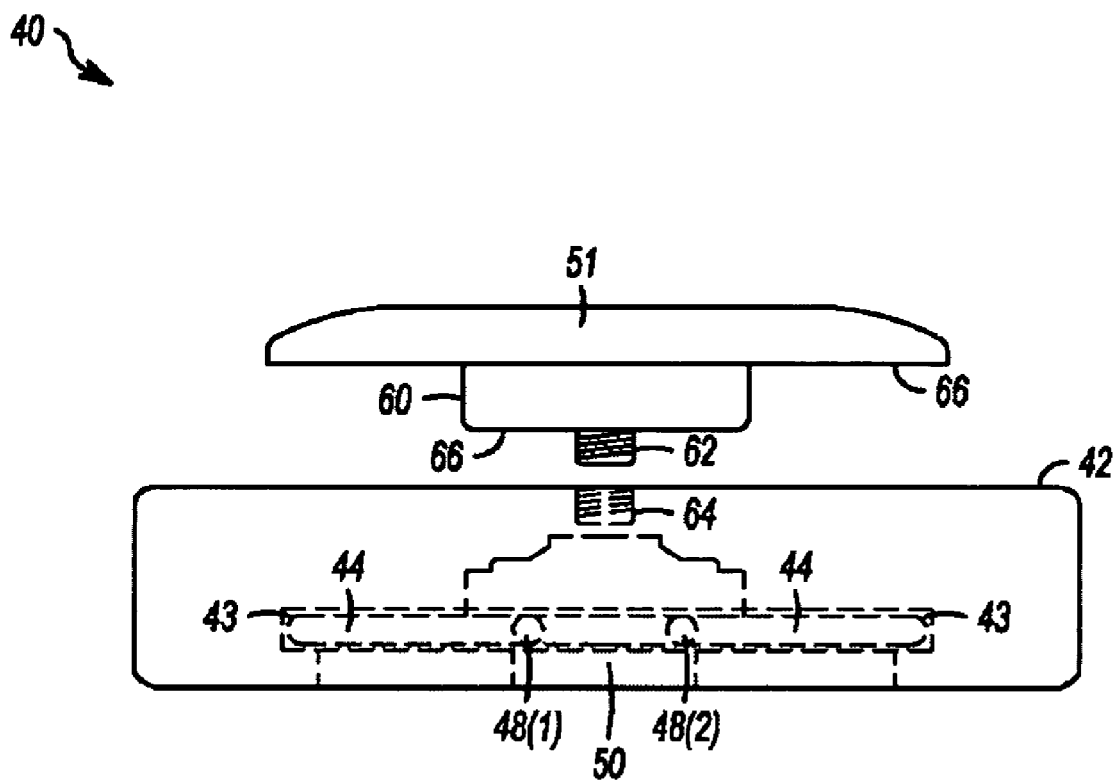
FIG. 7 is a side view diagram of the second fastening mechanism illustrated in FIG. 6.

Referring now to FIG. 7, an example of an assembled female fastening mechanism 40 is shown from a side view. The device strap 20(1) was omitted from FIG. 7 in this example for clarity only. Similar to the male fastening mechanism 30, the female fastening mechanism 40 may be positioned in the opening 22 of the device strap 20(1), for instance. The female fastener cap 51 is shown here as being coupled to the female housing 42 via the threaded connector 62 corresponding with the threaded female opening structure 64 as described earlier.

Figure 8:
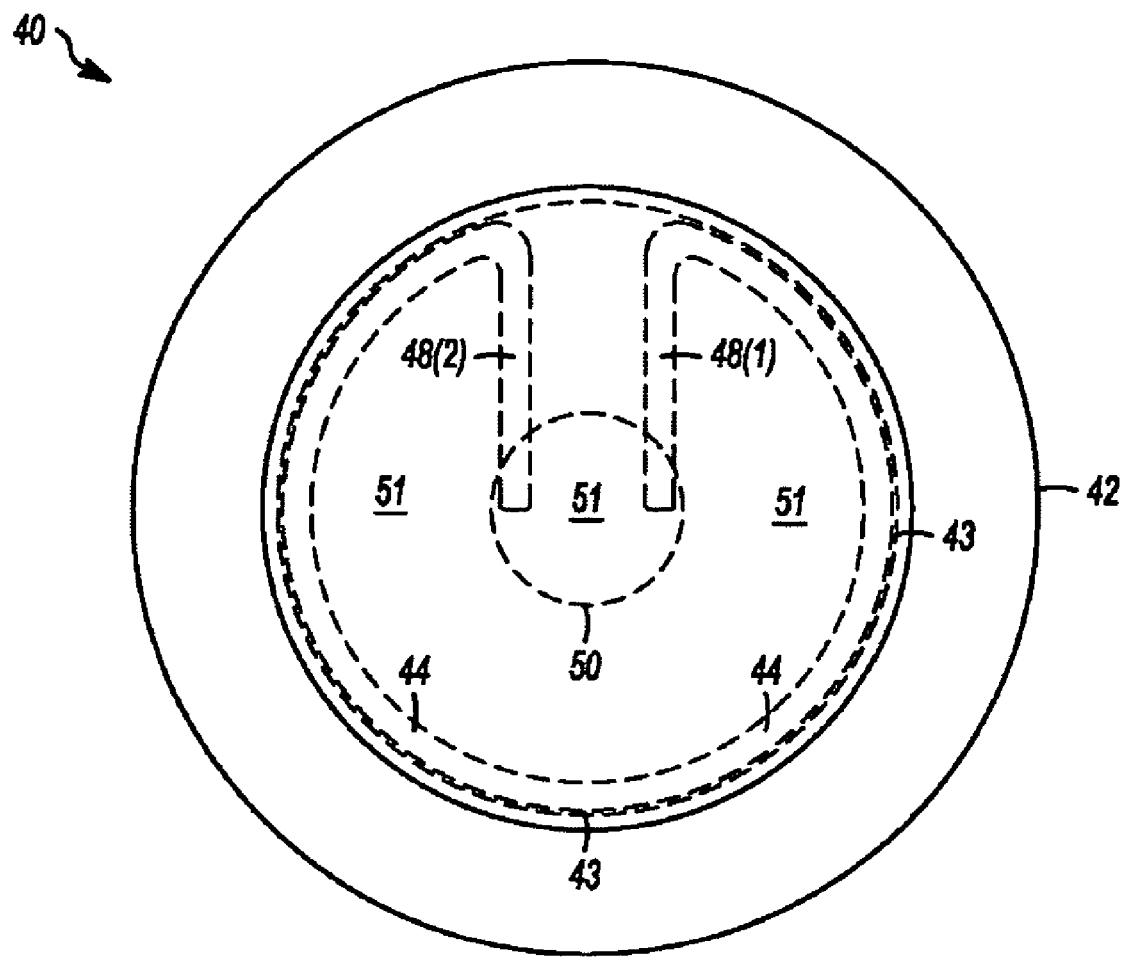
FIG. 8 is a is a top view diagram of the second fastening mechanism illustrated in FIG. 6.

Referring now to FIG. 8, a top view of the female fastening mechanism 40 is provided for descriptive and illustrative purposes only. As shown in FIG. 8, the spring structure 44 substantially occupies the channel structure 43 formed in the female housing 42, although the spring 44 could be arranged in the housing 42 in other ways and the spring 44 could have other shapes. Moreover, the spring engagement portions 48(1) and 48(2) can be seen substantially protruding or extending into the female engagement opening 50 formed in female housing 42, for instance. As mentioned above earlier, the male fastener head surfaces 36 of the male fastening mechanism 30 may engage the spring engagement portions 48(1) and 48(2) as the surface 36 is positioned in the engagement opening 50, for instance.

Figure 9:
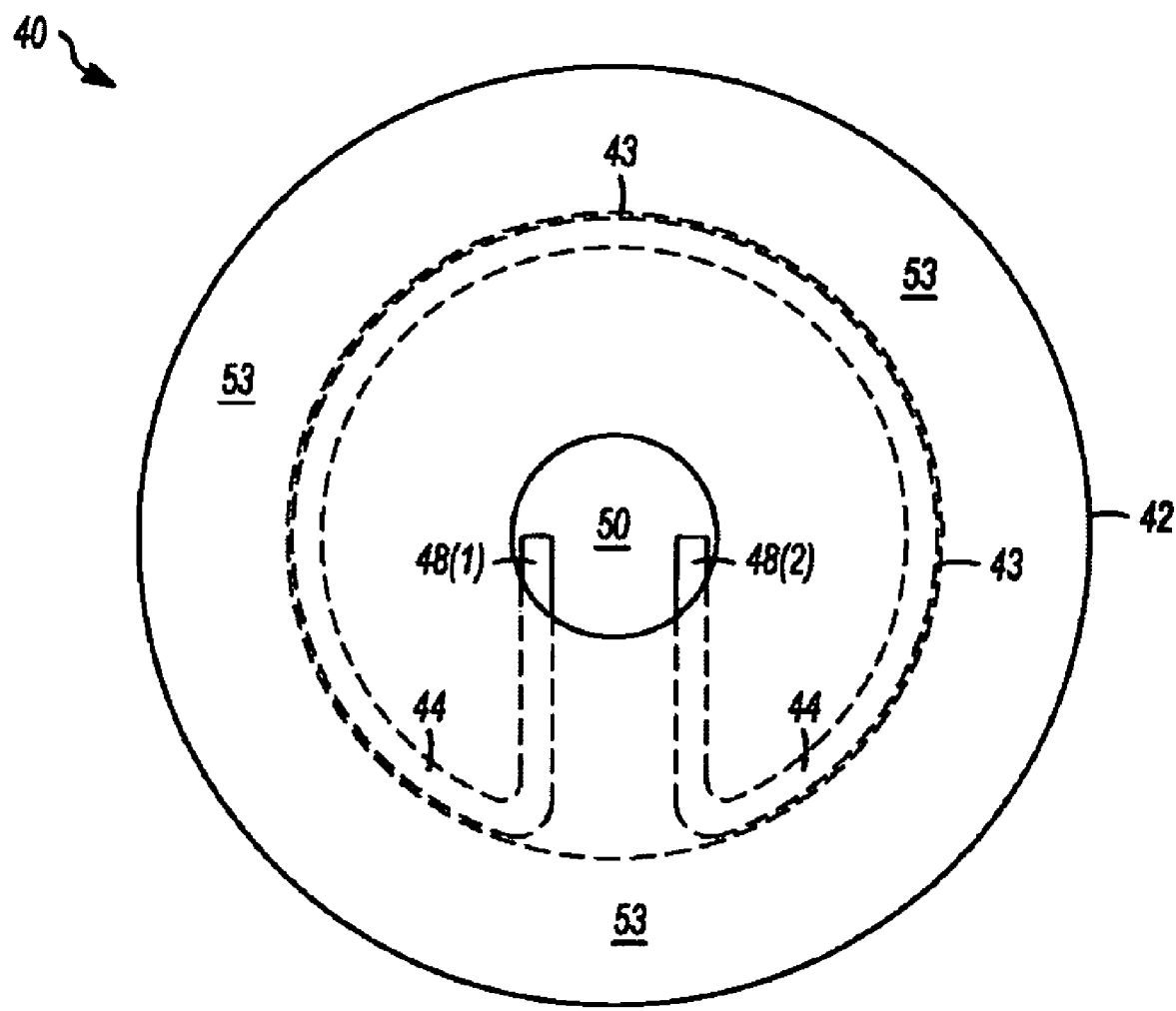
FIG. 9 is a bottom view diagram of the second fastening mechanism illustrated in FIG. 6.

Referring now to FIG. 9, a bottom view of the female fastening mechanism 40 is shown for exemplary and illustrative purposes only. As shown in FIG. 9, the spring engagement portions 48(1) and 48(2) can be clearly seen occupying at least a portion of the female engagement opening 50 on a bottom surface 43 of the female housing 42 when the portions 48(1)-48(2) are in an initial resting state or configuration within the female housing 42, for instance.

Referring generally to FIGS. 10-16, examples of how the male and female fastening mechanisms 30 and 40 described above in connection with FIGS. 1-9 may be used to securely and detachably fasten together the mobile device 10's device straps 20(1) and 20(2) while restoring and/or maintaining an electrical connection between the portions of the antenna structure 24 embedded in straps 20(1) and 20(2). Again, maintaining electrical connections between any portions of embedded antenna structure 24 may help ensure that one or more of the internal components in mobile device 10 may operate properly.

Figure 10:
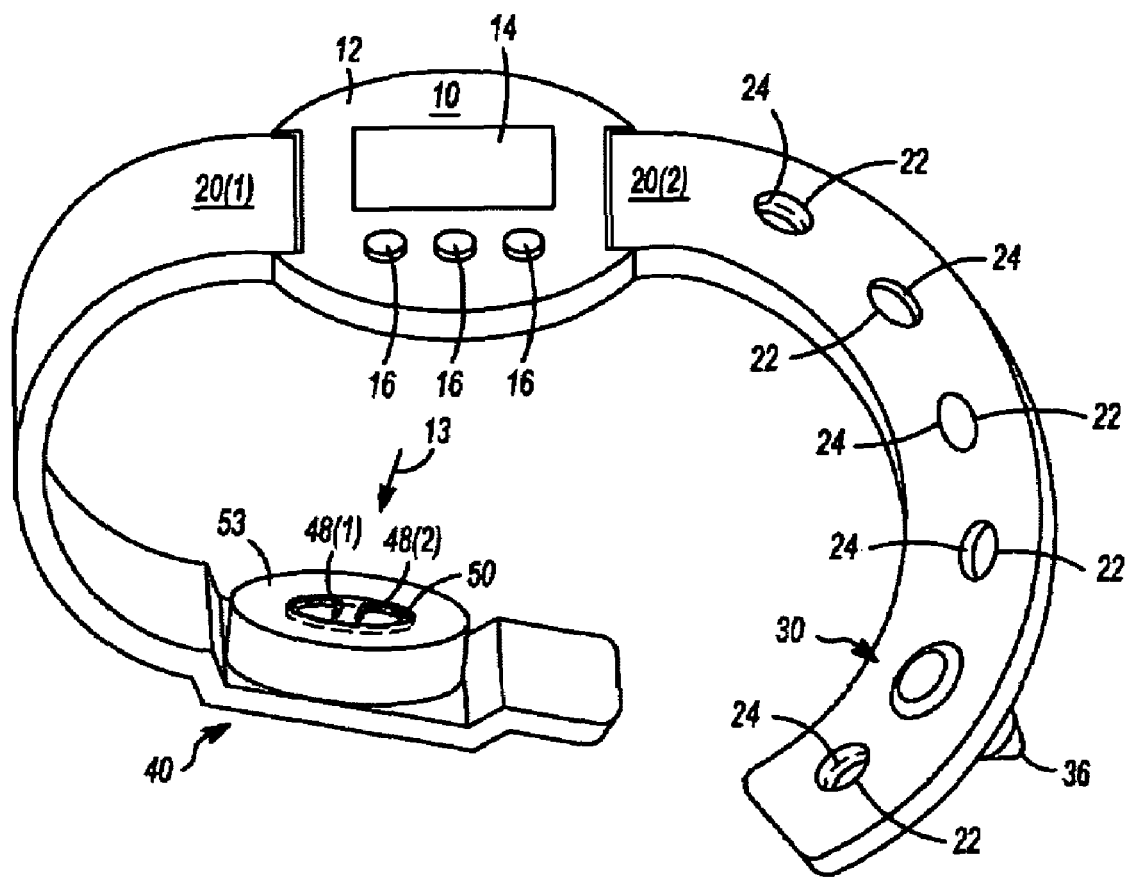
FIG. 10 is an isometric view of the mobile device illustrated in FIG. 1 substantially before a number of components may be fastened together by the first and second fastening mechanisms illustrated in FIGS. 2-9.

Referring now specifically to FIG. 10, the position and/or orientation of one or more portions of the male and/or female fastening mechanisms 30 and 40 may be manipulated by moving, arranging and/or otherwise handling portions of the device straps 20(1) and 20(2), for instance. Prior to manipulating the male and/or female fastening mechanisms 30 and 40, however, any desired adjustments with regard to the particular positioning of the mechanisms 30 and/or 40 on the straps 20(1) and 20(2) may be made. For example, the male fastening mechanism 30 may be positioned and/or assembled in a particular opening 22, for example.

Figure 11:
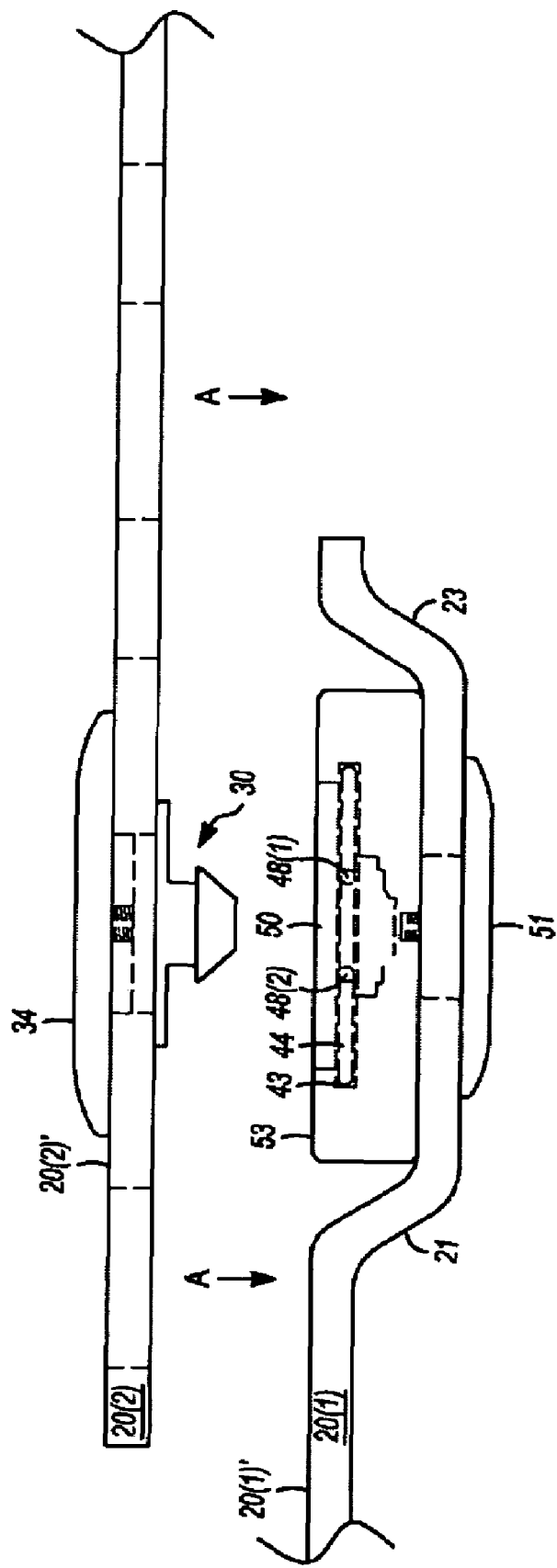
FIG. 11 is an exaggerated partial side view diagram of the first and second fastening mechanisms illustrated in FIGS. 2-10.

Referring to FIG. 11, by way of example only, a portion of the device strap 20(2) substantially adjacent male fastening mechanism 30 may be positioned substantially over and/or above the bottom surface 53 of female fastening structure 40, although the particular orientations of the fastening mechanisms 30 and 40 may be adjusted in a number of other ways that may be appropriate for a particular environment. Moreover, the male fastener head surfaces 36 on male fastening mechanism 30 may be positioned substantially over the female engagement opening structure 50 on female fastening mechanism 40. Male fastening mechanism 30 may be further positioned downwards towards the female fastening mechanism 40 in an "A" direction.

Figure 12:
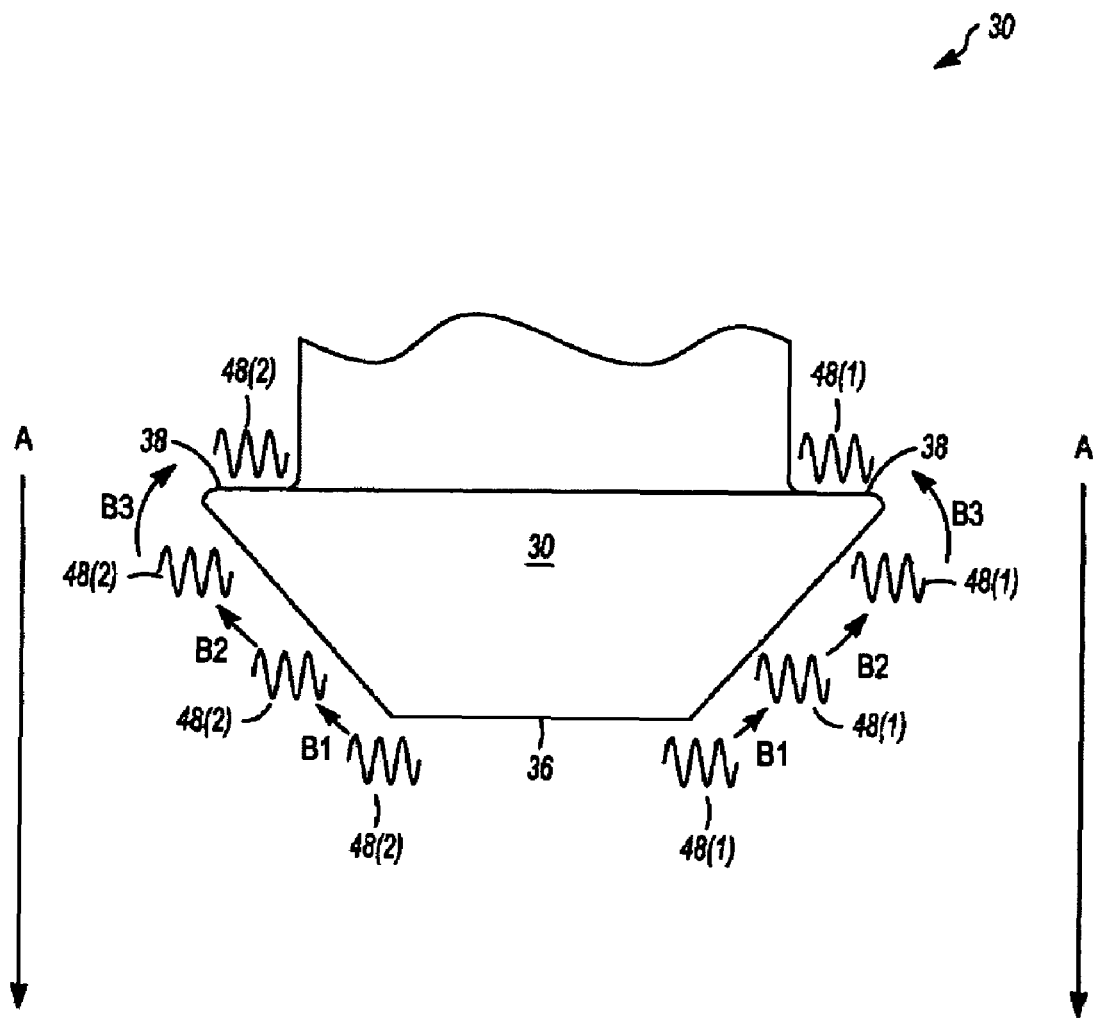
FIG. 12 is an exaggerated partial side view diagram illustrating the interaction between the first and second fastening mechanisms illustrated in FIGS. 2-11 as they engage each other.

Referring to FIG. 12, the male fastening mechanism 30 may continue advancing downwards in the "A" direction to substantially engage the spring engagement portions 48(1) and 48(2) of the spring structure 44. The spring structure 44 arranged in the female housing 42 may be displaced and may begin to substantially expand and/or spread apart for accommodating and/or making way for the encroaching male fastener head surfaces 36 on male fastening mechanism 30. With reference back to FIG. 9, the spring engagement portions 48(1) and 48(2) may expand and/or spread apart from each other in a direction substantially facing towards the female housing 42 as the male mechanism 30 continues moving into the female engagement hole structure 50.

Referring back to FIG. 12, the spring engagement portions 48(1) and 48(2) may initially expand to accommodate the circumference of the male fastening mechanism 30's outer surface substantially near positions "B1" situated substantially close to the male fastener head surfaces 36. As the male fastening mechanism 30 continues advancing downward, the spring engagement portions 48(1) and 48(2) may continue to expand accordingly to accommodate the increasingly widening circumference of the male fastening mechanism 30's outer surface substantially along positions "B2" and/or "B3," for instance.

Spring engagement portions 48(1) and 48(2) may substantially retract or snap back towards each other, however, responsive to the abruptly narrowed circumference of the male fastener body surfaces 32 on male fastening mechanism 30 substantially along positions "B3," for example. The spring engagement portions 48(1) and 48(2) may snap substantially back to their initial orientations prior to being displaced outwardly by the wider portions of the male fastening mechanism 30, such as their orientation along positions "B1," for example.

However, the spring engagement portions 48(1) and 48(2) may engage at least a portion of the indented male engagement surfaces 38 on male fastening mechanism 30 as the spring portions 48(1) and 48(2) snap back inwardly towards the relatively narrower male fastener body surfaces 32 on the mechanism 30, although the spring portions 48(1) and 48(2) do not necessarily need to constantly engage the indented male engagement surfaces 38.

With the spring engagement portions 48(1) and 48(2) snapping back to an orientation that may leave the engagement portions 48(1) and 48(2) substantially adjacent to the indented male engagement surfaces 38, the spring structure 44 may substantially secure the male fastening mechanism 30 within the female engagement hole structure 50. If a pulling force is applied for attempting to separate the male fastening mechanism 30 from the female fastening mechanism 40 in an opposite heading from the "A" direction, for example, the spring engagement portions 48(1) and 48(2) may engage the indented male engagement surfaces 38 to substantially prevent the mechanism from moving substantially past the point of engagement.

Figure 13:
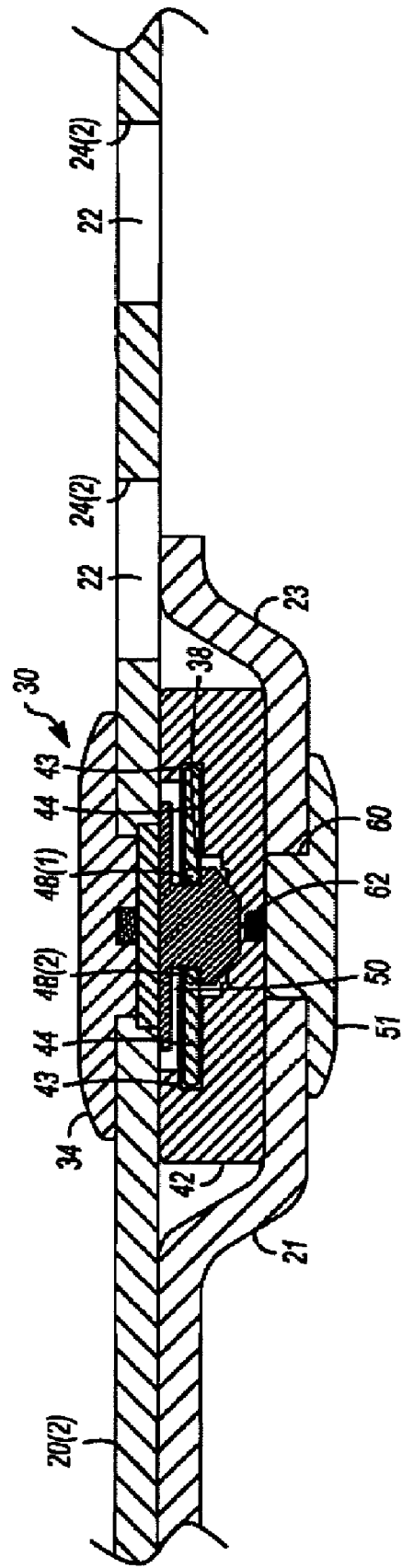
FIGS. 13 and 14 are exaggerated partial cross-sectional side view and bottom perspective view diagrams, respectively, of one or more portions of the first and second fastening mechanisms illustrated in FIGS. 2-12 being substantially secured together.

Referring to FIG. 13, a side cross-sectional view of the straps 20(1) and 20(2) in a substantially secured state relative to each other when the spring engagement portions 48(1) and 48(2) may be substantially engaged or are at least positioned substantially adjacent to the indented male engagement surfaces 38, for example. As shown in FIG. 13, moving the device straps 20(1) and 20(2) away from each other may be substantially halted when the spring engagement portions 48(1) and 48(2) substantially engage the indented male engagement surfaces 38, for example.

Further, a substantially closed circuit may be formed between the embedded antennae portions 24(1) and 24(2) since portions of the male fastening mechanism 30 may contact or otherwise substantially engage embedded antennae portion 24(2) in device strap 20(2) and portions of the female fastening mechanism 40 may likewise engage embedded antennae portion 24(1) in device strap 20(1).

Figure 14:
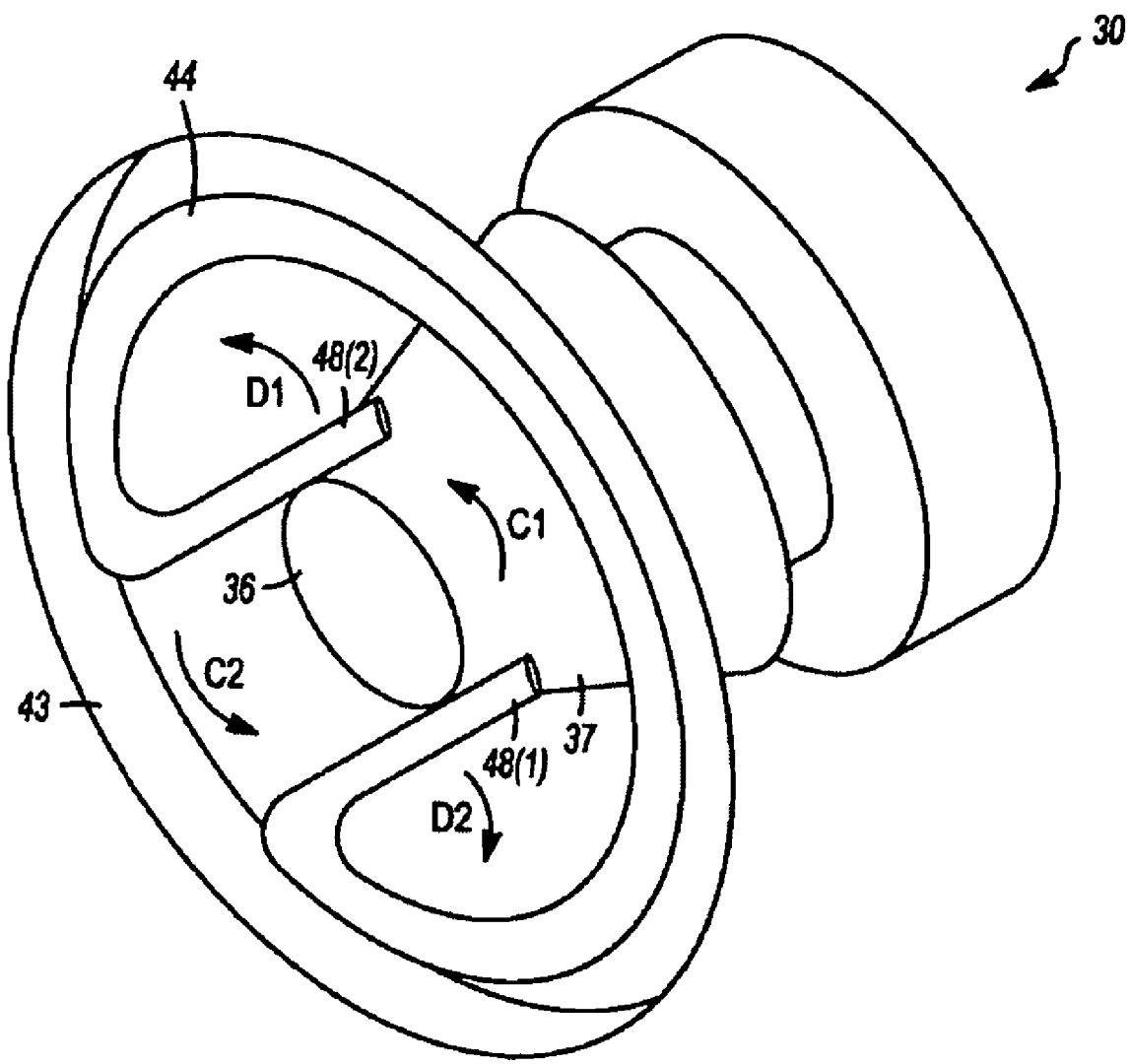

Referring to FIG. 14, a partial bottom perspective view diagram of the male fastening mechanism 30 shows the spring engagement portions 48(1) and 48(2) substantially engaging the male fastener body surfaces 32 below the indented male engagement surfaces 38. When the male fastening mechanism 30 enters the female engagement opening structure 50 on female fastening mechanism 40 and the spring engagement portions 48(1) and 48(2) substantially engage the indented male engagement surfaces 38, the mechanism 30 may substantially rotate in directions C1 and C2, although the mechanism could rotate in other directions or not at all.

For instance, if the engagement portions 48(1) and 48(2) substantially engage portions of the male body surfaces 32 that may be rounded, beveled or sloped in a particular direction as shown in FIG. 14, the male fastening mechanism 30 may rotate so as to perform a self-adjustment action until the spring engagement portions 48(1) and 48(2) substantially engage substantially flat or planar portions of the male body surfaces 32, for instance.

Furthermore, the exemplary configuration of the male body surfaces 32 shown in FIG. 14 may provide a mechanism for disengaging the male and female fastening mechanisms 30 and 40 from each other. For instance, the male and female fastening mechanisms 30 and 40 may be pulled apart from each other as the male mechanism 30 is substantially rotated in directions C1 and C2 to cause the substantially rounded, beveled or sloped portions of the male body surfaces 32 to engage the spring engagement portions 48(1) and 48(2).

This action may cause the spring engagement portions 48(1) and 48(2) to be substantially displaced and/or substantially expanded away from each other in either direction D1 and/or D2. When the spring engagement portions 48(1) and 48(2) may be sufficiently displaced apart from each other, the male fastener head surfaces 36 may have substantially ample room to pass through the engagement portions 48(1) and 48(2) and out of the female engagement opening structure 50, for example.

Figure 15:
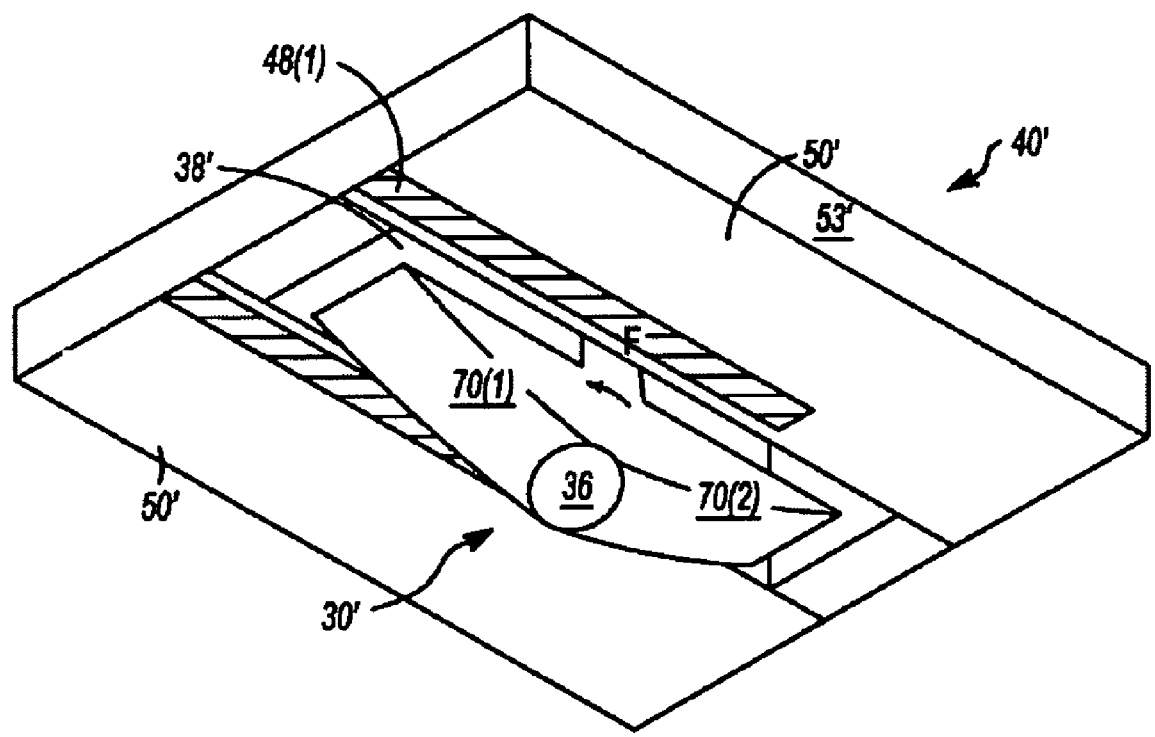
FIGS. 15 and 16 are exaggerated partial bottom perspective views of other exemplary implementations for the first and second fastening mechanisms illustrated in FIGS. 2-14.
Figure 16:
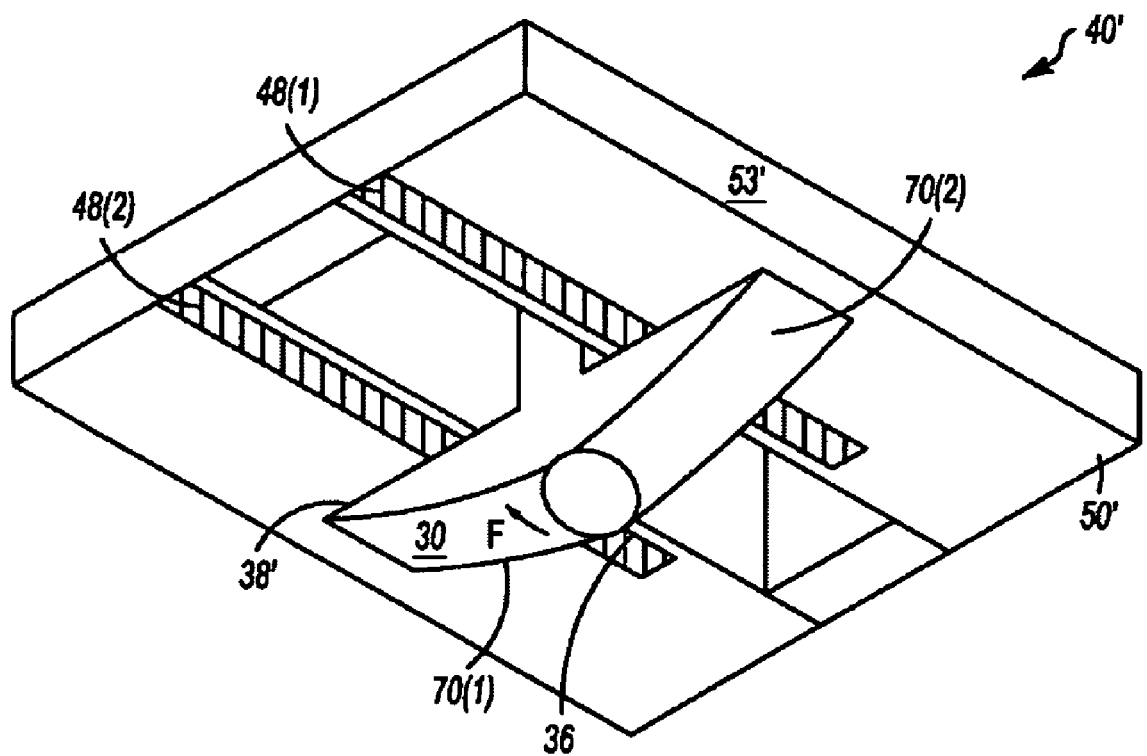

Referring now to FIGS. 15 and 16, other exemplary implementations for the first and second fastening mechanisms illustrated in FIGS. 2-14 are shown. As shown in FIG. 15, another male fastening mechanism 30' may have substantially rectangular shaped distal male head surface structure 36' that may enter the other female engagement opening structure 50' when the structure 36' may be oriented in a number of ways. For instance, at least one of either a male engagement portion 70(1) and/or 70(2) of the substantially rectangular shaped distal male head surface structure 36' may be oriented to pass into the other opening 50' in between the spring engagement portions 48(1) and 48(2), for example.

In this example, the substantially rectangular shaped distal male head surface structure 36' may be substantially rotated or twisted in an "F" direction when either of the male engagement portions 70(1) and/or 70(2) may be initially positioned between the spring engagement portions 48(1) and 48(2) as shown in FIG. 15, although the structure 36' may be twisted opposite the "F" direction.

For instance, the other male fastener body surfaces 32' may be configured (e.g., beveled) such that the twisting motion may cause the substantially rectangular shaped distal male head surface structure 36' to be substantially driven farther into the opening 50' sufficiently past the spring engagement portions 48(1) and 48(2) as shown in FIG. 16. However, the substantially rectangular shaped distal male head surface structure 36' could simply be pushed inwards sufficiently past the spring engagement portions 48(1) and 48(2) where the other male fastener body surfaces 32' may not be configured in such a manner as to cause the substantially rectangular shaped distal male head surface structure 36' to be driven inward when twisted.

As shown in FIG. 16, the substantially rectangular shaped distal male head surface structure 36' may engage at least one of either the spring engagement portions 48(1) and 48(2) or internal engagement portions of the bottom female housing 42', for example, to substantially prevent the other male and female fastening mechanisms 30' and 40' from being separated. If the other male fastening mechanism 30' rotates in the other female fastening mechanism 40' so that the male engagement portions 70(1) and/or 70(2) may be initially positioned between the spring engagement portions 48(1) and 48(2), the configuration of the other male fastener body surfaces 32' may prevent the substantially rectangular shaped distal male head surface structure 36' from passing substantially out of the opening 50'.

To disengage and/or separate the other male and female fastening mechanisms 30' and 40' from each other, an inserted and engaged male fastening mechanism 30' may be twisted opposite the "F" direction or other direction it was twisted during engagement so that the configuration of the other male fastener body surfaces 32' may cause the substantially rectangular shaped distal male head surface structure 36' to be substantially driven past the spring engagement portions 48(1) and 48(2) substantially and substantially out through the opening 50', for example.

However, the substantially rectangular shaped distal male head surface structure 36' could simply be pushed and/or pulled outwards sufficiently past the spring engagement portions 48(1) and 48(2) where the other male fastener body surfaces 32' may not be configured in such a manner as to cause the substantially rectangular shaped distal male head surface structure 36' to be driven outward when twisted opposite the "F" or other engagement direction.

While particular examples and possible implementations have been called out above, alternatives, modifications, variations, improvements and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed process to any order except as may be specified in the claims.

What is claimed is:

1. At least one device comprising:
   a female fastening mechanism coupled to at least one device strap portion;
   an opening formed in an engagement surface of the at least one female fastening mechanism;
   a spring member substantially surrounding the opening formed in the engagement surface of the female fastening mechanism;
   at least one portion of the spring member engaging at least a portion of a male fastening mechanism responsive to positioning the male and female fastening mechanisms relative to each other to place the male fastening mechanism substantially within the opening formed in the engagement surface; and
   the engagement between the male and female fastening mechanisms causing at least one of either separating or securing at least one device strap portion, wherein the female fastening mechanism comprises a housing wheel that can be manipulated to cause the opening formed in the engagement surface of the female fastening mechanism to twist or turn.

2. The at least one device of claim 1, further comprising:
at least one first device strap portion coupled to at least one first casing surface on the at least one device; and
at least one second device strap portion coupled to at least one second casing surface on the at least one device.

3. The at least one device of claim 1, further comprising:
one or more antennae components embedded in at least one device strap portion.

4. The at least one device of claim 3, wherein the at least one device strap portion incorporating the one or more embedded antennae components can be coupled and decoupled.

5. The at least one device of claim 3, wherein the embedded antennae components are mechanically and electrically connected when male and female fastening mechanisms are coupled together.

6. The at least one device of claim 1, wherein the engagement opening formed on the engagement surface on the female fastening mechanism has a substantially square shape, rectangular shape, circular shape or any other shape.

7. The at least one device of claim 1, wherein the male fastening mechanism further comprises:
a head portion having a substantially conical shape with a circumference that increases from a first end of the head portion to a second end of the head portion adjacent a lower body portion;
the lower body portion having a substantially narrower circumference than the head portion; and
the lower body portion having a substantially narrower surface area than the head portion to form an indented surface portion forming a bottom surface of the head portion.

8. The at least one device of claim 7, wherein the indented surface portion forming a bottom surface of the head portion and the spring member substantially engage each other to substantially secure the female fastening mechanism and the male fastening mechanisms together.

9. The at least one device of claim 1, wherein the male fastening mechanism further comprises:
a substantially rectangular shaped head portion;
a lower body portion having a substantially narrower surface area than the substantially rectangular shaped head portion to form an indented surface portion forming a bottom surface of the substantially rectangular shaped head portion.

10. The at least one device of claim 9, wherein a number of surfaces on the substantially rectangular shaped head portion that engage the spring member are configured to drive the male fastening mechanism substantially into or out of the female fastening mechanism when at least one of either the male or female fastening mechanisms are substantially twisted in one or more directions.

11. The at least one device of claim 10, wherein the configured surfaces on the substantially rectangular shaped head portion substantially forces portions of the spring structure away from the substantially rectangular shaped head portion and drives the male fastening mechanisms out from the female fastening mechanism when twisting the either the male or female fastening mechanisms.

12. At least one fastening mechanism for coupling one or more device components together comprising:
at least one opening formed in at least one engagement surface of the at least one fastening mechanism;
a spring member substantially surrounding the opening formed in the engagement surface;
at least one portion of the spring member engaging at least a portion of a male fastening mechanism responsive to positioning the male and female fastening mechanisms relative to each other to place the male fastening mechanism substantially within the opening formed in the engagement surface; and
the engagement between the male fastening mechanism and the female fastening mechanism causing at least one of either separating or securing the device components;
wherein the at least one fastening mechanism comprises a housing wheel that can be manipulated to cause the at least one opening formed in the at least one engagement surface to twist or turn.

13. The at least one fastening mechanism of claim 12, wherein the engagement opening formed on the engagement surface has a substantially square shape, rectangular shape, circular shape or any other shape.

14. The at least one fastening mechanism of claim 12, wherein portions of the spring structure are forced away from at least one of either a lower body portion or a head portion of the male fastening mechanism to engage or disengage the male and female fastening mechanisms when the housing wheel is manipulated in one or more directions.

15. The at least one fastening mechanism of claim 12, wherein portions of the spring structure engage portions of a head portion of the male fastening mechanism to drive the male fastening mechanism substantially into or out of the female fastening mechanism when the housing wheel is manipulated in one or more directions.

16. At least one fastening mechanism for coupling one or more device components together comprising:
a first cooperating fastening mechanism and a second cooperating fastening mechanism, the first cooperating fastening mechanism comprising:
a head portion with a circumference that increases from a first end of the head portion to a second end of the head portion adjacent a lower body portion;
the lower body portion having a substantially smaller surface area than the head portion to form an indented surface portion forming a bottom surface of the head portion; and
the indented surface portion engaging at least one portion of a spring member substantially protruding out into an opening formed in an engagement surface of the second cooperating fastening mechanism to cause at least one of either separating or securing the first and second cooperating fastening mechanisms together,
wherein the second cooperating fastening mechanism comprises a housing wheel that can be manipulated to cause the opening formed in the engagement surface of the second cooperating fastening mechanism to twist or turn.

17. The at least one device of claim 16, wherein the head portion engages portions of a spring member for driving the first cooperating fastening mechanism substantially into or out of an opening formed in an engagement surface of the second cooperating fastening mechanism when at least one of the first and second cooperating fastening mechanisms are substantially twisted in one or more directions.

18. The at least one device of claim 16, wherein the head portion substantially forces portions of a spring member that is substantially engaging the head portion away from the head portion when substantially twisting at least one of the first and second cooperating fastening mechanisms.

* * * * *